US006447179B1

(12) United States Patent
Sanda et al.

(10) Patent No.: US 6,447,179 B1
(45) Date of Patent: Sep. 10, 2002

(54) CONVEYING ROLLER FOR PHOTOSENSITIVE MATERIAL AND METHOD OF PRODUCING THE SAME

(75) Inventors: Akihiro Sanda; Takashi Kubo; Hideki Matsuzawa; Masayoshi Wada, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/144,437

(22) Filed: Sep. 1, 1998

Related U.S. Application Data

(63) Continuation-in-part of application No. 09/045,825, filed on Mar. 23, 1998, now abandoned.

(30) Foreign Application Priority Data

| | | |
|---|---|---|
| Mar. 24, 1997 | (JP) | 9-69789 |
| Jun. 23, 1997 | (JP) | 9-165436 |
| Feb. 3, 1998 | (JP) | 10-021943 |

(51) Int. Cl.[7] ..................... F16C 13/00; G03D 3/08

(52) U.S. Cl. ..................... 396/612; 492/59; 492/60; 396/567; 396/568

(58) Field of Search ..................... 492/58, 59, 54, 492/60; 355/27–24, 40, 41; 396/567–570, 578, 612

(56) References Cited

U.S. PATENT DOCUMENTS

| | | | | |
|---|---|---|---|---|
| 5,290,332 A | | 3/1994 | Chatterjee et al. | 65/18.1 |
| 5,334,288 A | * | 8/1994 | Nasu et al. | 492/58 |
| 5,336,282 A | | 8/1994 | Ghosh et al. | 51/309 |
| 5,674,171 A | * | 10/1997 | Ichino et al. | 492/58 |

FOREIGN PATENT DOCUMENTS

| | | |
|---|---|---|
| DE | 8102225 | 1/1983 |
| EP | 401886 | 12/1990 |
| EP | 651385 | 5/1995 |
| EP | 732311 | 9/1996 |

* cited by examiner

*Primary Examiner*—Della J Rutledge
(74) *Attorney, Agent, or Firm*—Sughrue Mion, PLLC

(57) ABSTRACT

Continuous photo film includes a support of resin film having a back surface. A photosensitive layer of photographic emulsion is disposed on a surface of the support opposite to the back surface. A conveying roller conveys the continuous photo film. The conveying roller includes a roller body of metal. A hardness reinforcer layer is formed on a surface of the roller body by thermal spraying of ceramic or cermet, so that the roller body surface is prevented from being scratched or ground by the back surface of the film.

7 Claims, 7 Drawing Sheets

CONVEYING ROLLER FOR PHOTOSENSITIVE MATERIAL AND METHOD OF PRODUCING THE SAME

This is a Continuation-In-Part of application Ser. No. 09/045,825 filed Mar. 23, 1998 abandoned, the entirety of which is incorporated herein by reference.

BACKGROUND OF THE INVENTION

1. Field of the Invention

The present invention relates to a conveying roller for photosensitive material, and a method of producing the same. More particularly, the present invention relates to a conveying roller for photosensitive material, which has high resistance to abrasion and can be produced easily, and a method of producing the same.

2. Description of the Related Art

Photosensitive material, in general, is constituted by a support and a photosensitive layer of photographic emulsion, which is applied as a coating to, or deposited to, the support. According to various kinds of the support, there are plural examples of photosensitive material, including photo film, dry plate, and photographic paper. The photo film has the support produced from film of resin. Types of the photo film includes a roll photo film and a sheet photo film. Examples of the roll photo film include the 8 mm type and the 1,000 mm type. Examples of the sheet photo film include types of 4×5 cm, the cabinet size (halfplate), B5, A4, B4, A3 and 10×12 inches. As a form of the most widely used photo film, a photo film cassette is well-known, and includes a cassette shell, a spool rotatable inside the cassette shell, and a strip of the photo film whose end is retained on the spool and which is wound about the spool.

The photo film is conveyed by conveying rollers in optical instruments. Conveying rollers for use in the photo film manufacturing apparatus, a photographic printer and a photo film processor are constituted by a roller body formed by cutting and scraping a rod of stainless steel, or by a roller body of metal and hard chromium plating formed on its surfaces. To avoid atdamaging continuous photo film and photo filmstrip in conveyance, a surface of the roller is finished by polishing, and smoothed for the contact with the photo film.

There is a type of photo filmstrip including a magnetic recording layer, which is a coating of magnetic material applied to the support on the side opposite to the photosensitive layer, so that the photo filmstrip can operate for storing magnetic information written thereto. There is abrasive material or polishing agent, mixed with the magnetic material, for contacting a magnetic head of an information reader/writer, to remove dust or dirt from the magnetic head. When a conveying roller contacts the continuous photo film which will become this type of photo filmstrip, the conveying roller is abraded and deformed by the abrasive material of the photo film, because the conveying roller contacts the magnetic recording layer. It is likely that the continuous photo film or photo filmstrip is fogged by pressure, scratched or damaged. A life of the roller is short, so that each roller must be replaced with an unused one very frequently.

To solve those problems, JP-A 8-262680 (corresponding to U.S. Pat. No. 5,520,601) discloses a use of such ceramics for a conveying roller as yttria-alloyed tetragonal polycrystalline zirconia, which is zirconium oxide and yttria mixed therewith at 3–5 mole W. Ceramics characteristically have a higher hardness than stainless steel and hard chromium plating, and have higher resistance to abrasion. However it is difficult to cut or scrape a ceramic product into a complicated shape due to the considerable hardness of the ceramics. Ceramics are unsuitable for shaping the roller which includes a roller core and flanges on respective ends of the roller core, and in which a diameter of the roller core is partially changed. Moreover a problem lies in that zircon[] stabilized by use of yttria is likely to collect static charge electrically. The continuous photo film might be fogged and have a lowered quality.

A guide rail 120 according to the related art is described with reference to FIG. 9. The guide rail 120 consists of a combination of an upper guide plate 121 and a lower guide plate 122 secured thereto. The guide plates 121 and 122 are extended in a conveying direction of the continuous photo film 11, and define a photo film conveying path 123 between them for passing the continuous photo film 11. Respective lateral edges of the photo film conveying path 123 have support grooves 124 and 125, which are formed to reduce a range of the photo film conveying path 123 in its thickness direction. Support surfaces of the support grooves 124 and 125 support lateral edges of the continuous photo film 11. Lateral surfaces of the support grooves 124 and 125 prevent the continuous photo film 11 from being offset in the width direction. An area of contact between the continuous photo film 11 and the inside of the photo film conveying path 123 is reduced by the operation of the support grooves 124 and 125. The photo film surface of the continuous photo film 11 is prevented from 59 being damaged while the continuous photo film 11 is conveyed. Inner corners 124*a*, 124*b*, 124*c*, 125*a*, 125*b* and 125*c* are defined on the support grooves 124 and 125, and rounded with a curvature, so as to reduce load to the continuous photo film 11 contacted by the support grooves 124 and 125. The guide rail used in the photo film manufacturing apparatus, or optical instruments such as photographic printer, photo film processor and others for use with photo film, is constituted by the upper and lower guide plates produced by cutting and scraping a stainless steel plate. Moreover hard chromium plating is formed on surfaces of the scraped plate before assembly of the guide rail. To avoid damaging the continuous photo film or photo filmstrip being conveyed, the guide rail is finished by the polishing finish or sanding finish to have a smoothed contact surface.

However there is a problem in the guide -rail according to the related art in that precision in regulating the continuous photo film in the width direction is likely to become low. This is because lateral walls of the conveying path are likely to be ground and deformed by contact with the edges of the continuous photo film, typically when used in the apparatus where the continuous photo film is conveyed at high speed. To maintain high precision in the positions, the guide rails must be renewed in a considerably frequent manner. The cost for the manufacturing apparatus is thus high.

To solve those problems, JP-A 8-310698 discloses a guide rail in which a protective member is attached to the inside surface of the conveying path, and a use of such ceramics for the protective member as yttria-alloyed tetragonal zirconia polycrystals (Y-TZP), which is zirconium oxide and yttria mixed therewith at 3–5 mole %. As ceramics have higher hardness and higher resistance to abrasion than stainless steel or hard chrome plating which is used conventionally, the attached ceramic protective member raises the surface hardness inside the conveying path. It is however extremely difficult to cut and scrape a complicated shape of a ceramic member, because of the hardness of the ceramic. The guide rail 120 of FIG. 9, in which the corners are defined on the support grooves 124 and 125, and rounded with a curvature, is SO complicated that a protective member associated therewith is difficult to produce. The zirconia stabilized with yttria is likely to be charged electrically. Pressure fogging and scratches are likely to occur, which would damage the image quality of the continuous photo film 11.

The photo filmstrip may include a magnetic recording layer. When the conveying path of the guide rail contacts the continuous photo film, which will become this type of photo filmstrip, the conveying path is abraded and deformed by the abrasive material in the magnetic recording layer, because the conveying path contacts the magnetic recording layer. It is likely that the continuous photo film or photo filmstrip is fogged by pressure, scratched or damaged.

SUMMARY OF THE INVENTION

In view of the foregoing problems, an object of the present invention is to provide a conveying-roller for photosensitive material, which has high resistance to abrasion and can be produced easily, and a method of producing the same.

In order to achieve the above and other objects and advantages of this invention, a conveying roller conveys photosensitive material, the photosensitive material including a support of resin film having a back surface, and a photosensitive layer of photographic emulsion disposed on a surface of the support opposite to the back surface. The conveying roller includes a roller body of metal. A hardness reinforcer layer is formed on a surface of the roller body by thermal spraying and from ceramic or cermet, for avoiding being scratched or ground by the back surface.

Moreover, the hardness reinforcer layer has a surface of which at least one portion is polished and smoothed, and the at least one portion contacts the photosensitive material.

The photosensitive material further includes a magnetic recording layer, formed on the back surface of the support, and including magnetic material and polishing agent.

In another preferred embodiment, the conveying roller includes a roller body of metal. A diamond-like carbon coating is formed on a surface of the roller body by an ion plating method, in order to avoid being scratched or ground by the back surface or the photosensitive material.

Furthermore, the roller body has a surface of which at least one portion is polished and smoothed, and the at least one portion contacts the photosensitive material via the diamond-like carbon coating.

Consequently in the present invention, the conveying roller for photosensitive material can have high resistance to abrasion and can be produced easily.

In still another preferred embodiment, a conveyor guide rail is provided for guiding conveyance of continuous photosensitive material. A guide rail body of metal is extended in a longitudinal direction of the photosensitive material, and includes a conveying surface along which the photosensitive material is conveyed. A hardness reinforcer layer is formed on at least one part of the conveying surface, has higher hardness than hard chrome plating, and contacts the photosensitive material. At least one part of the hardness reinforcer layer or the at least one part of the conveying surface is polished and smoothed.

The guide rail body includes a lower-guide plate and an upper guide plate secured to each other in a confronted manner. The conveying surface comprises lower and upper conveying surfaces, the lower conveying surface lies on the lower guide plate, the upper conveying surface lies on the upper guide plate. The photosensitive material is conveyed between the lower and upper conveying surfaces.

In one aspect of the present invention, the hardness reinforcer layer is a ceramic or cermet coating formed on the lower and upper conveying surfaces by thermal spraying, and is then polished and smoothed.

In another aspect of the present invention, the hardness reinforcer layer is a diamond-like carbon coating formed by an ion plating method after the lower and upper conveying surfaces are polished and smoothed.

Furthermore, the photosensitive material includes first and second lateral edges extended in the longitudinal direction and arranged opposite to each other. The lower conveying surface includes first and second side portions for supporting respectively the first and second lateral edges, the lower guide plate having a lower retracted surface between the first and s second side portions, the lower retracted surface being kept at a predetermined distance from a center of the photosensitive material. The upper conveying surface includes third and fourth side portions for receiving respectively the first and second lateral edges, the upper guide plate having an upper retracted surface between the third and fourth side portions, the upper retracted surface being kept at a predetermined distance from the center of the photosensitive material.

Consequently in the present invention, the conveyor guide rail for photosensitive material can have high resistance to abrasion and can be produced easily.

BRIEF DESCRIPTION OF THE DRAWINGS

The above objects and advantages of the present invention will become more apparent from the following detailed description when read in connection with the accompanying drawings, in which.

DESCRIPTION OF THE PREFERRED EMBODIMENT

Figures 1, 1A:
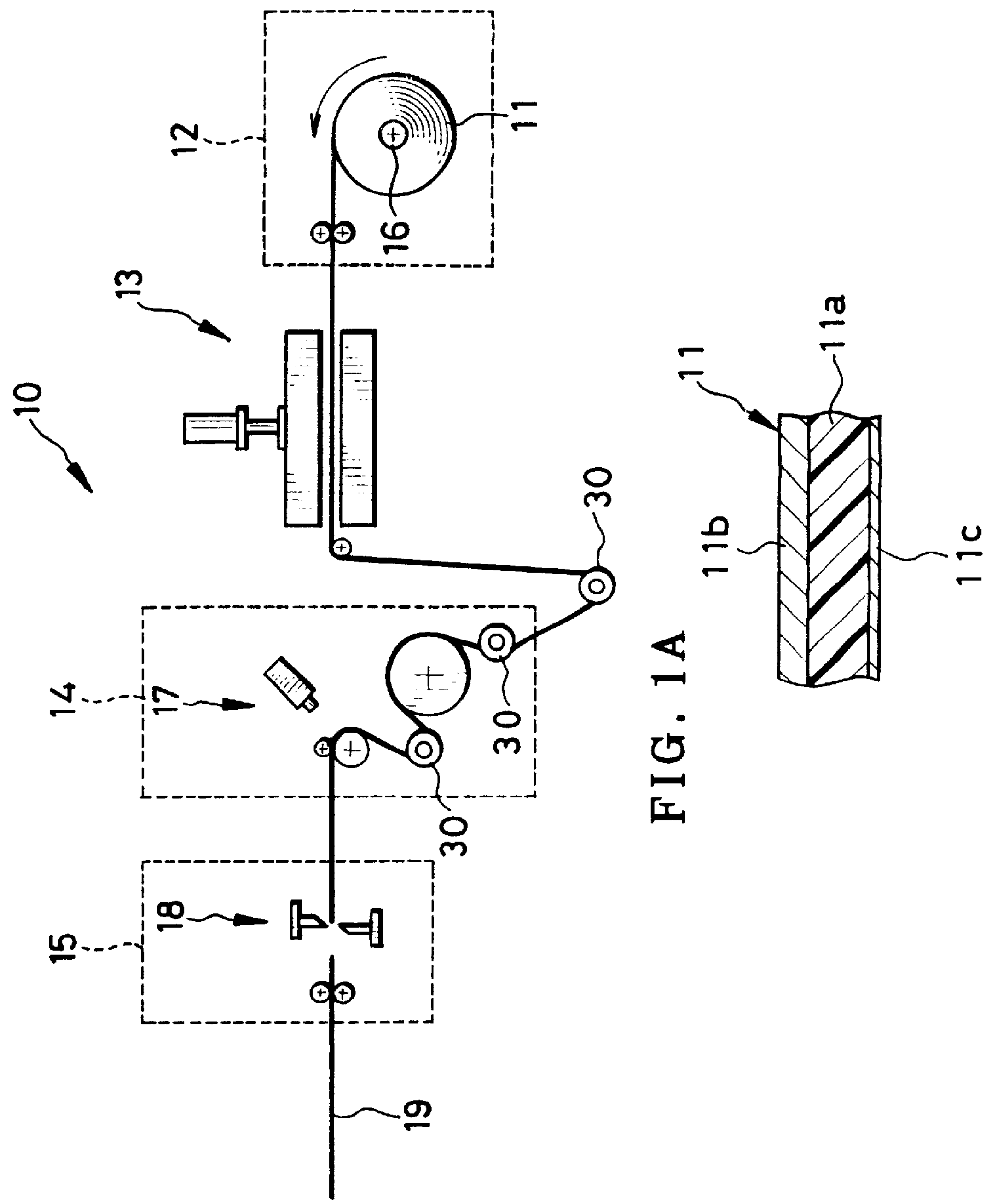
FIG. 1 is an explanatory view illustrating a photo film manufacturing apparatus.
FIG. 1A is an explanatory view in cross section, illustrating a layered structure of photo film.

In FIG. 1, a photo film manufacturing apparatus 10 is illustrated. The photo film manufacturing apparatus 10 produces photo film to be used in a photo film cassette. The photo film manufacturing apparatus 10 is constituted by a photo film supplier unit 12, a perforator unit 13, a side printer unit 14 and a cutter unit 15. Continuous photo film 11 is basically constituted by a support 11*a* and a photosensitive layer 11*b*. See FIG. 1A. The support 11*a* consists of a film of resin. The photosensitive layer 11*b* consists of a coating of photographic emulsion applied to one face of the support 11*a*. The continuous photo film 11 has a predetermined width by which raw material with a considerable width has been slitted. The continuous photo film 11 is wound about a reel 16 with the photosensitive layer 11*b* positioned inside, and placed in the photo film supplier unit 12. At first the continuous photo film 11 is conveyed to the perforator unit 13, in which a train of perforations are formed in the continuous photo film 11 along one edge of the continuous photo film 11. Then the continuous photo film 11 is conveyed to the side printer unit 14. The side printer unit 14 is constituted by a printer head 17 including for example a plurality of small light-emitting diodes (LED).

While the continuous photo film 11 is moved past the front of the printer head 17, the printer head 17 photographically records information to edges of the continuous photo film 11, the information including a manufacturer's name, the number of available frames, a photo film type, the number of the photographic emulsion, and the like. Then the continuous photo film 11 is conveyed to the cutter unit 15, in which a cutter 18 cuts the continuous photo film 11 by a unit as length into a photo filmstrip 19 with regular shapes of a leader and a trailer. Then the photo filmstrip 19 is transferred to a station for assembling parts of a photo film cassette, and is wound into a shell of the cassette.

Figure 2:
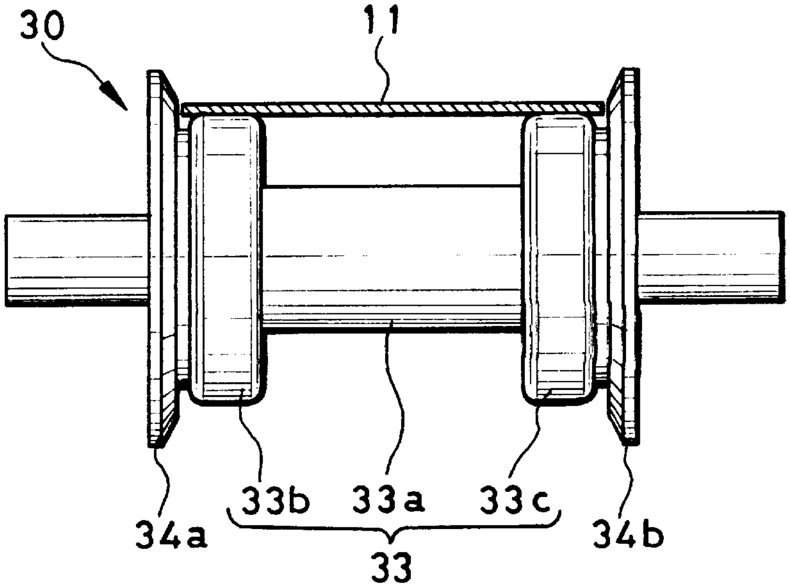
FIG. 2 is an elevation illustrating a conveying roller with the continuous photo film.
Figure 3:
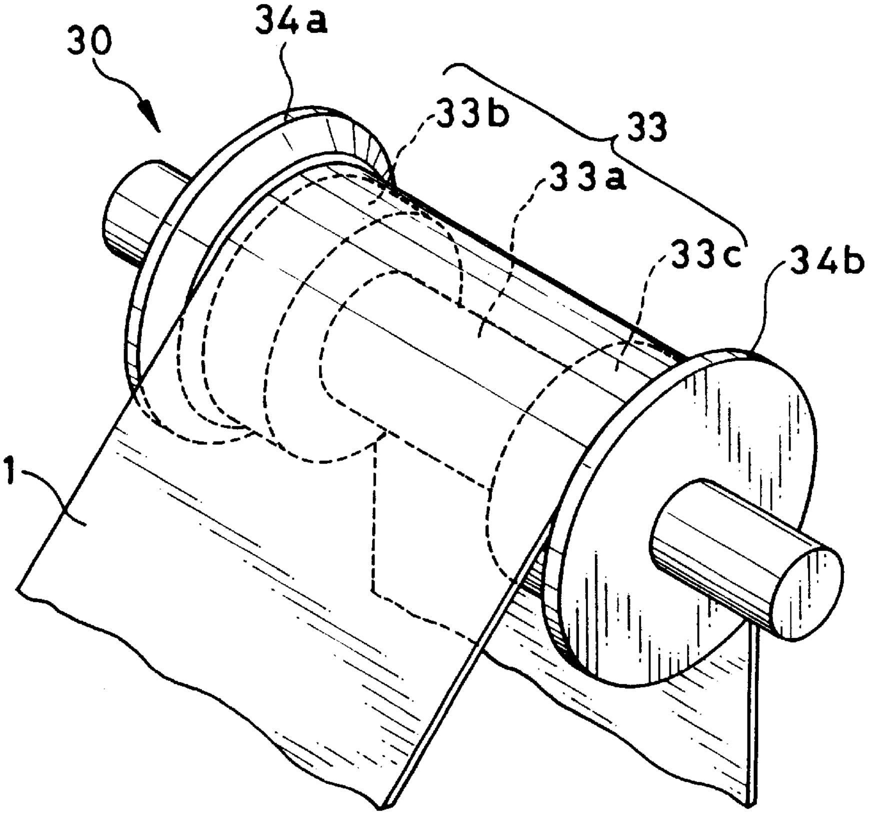
FIG. 3 is a perspective illustrating the conveying roller and the continuous photo film.

A plurality of conveying rollers 30 are disposed in the photo film manufacturing apparatus 10 for conveying the continuous photo film 11. In FIGS. 2 and 3, each of the conveying rollers 30 includes a roller core 33 and flanges 34*a* and 34*b* disposed on respective ends of the roller core 33. The flanges 34*a* and 34*b* contact edges of the continuous photo film 11, and limit a movable range of the continuous photo film 11 in its width direction. Thus the continuous photo film 11 is stably conveyed, and appropriately can have a perforating position and an image recording position in the perforator unit 13 and the side printer unit 14. The roller core 33 has a central portion 33*a* of a relatively small diameter. Roll portions 33*b* and 33*c* have a greater diameter, and support respective edge portions of the continuous photo film 11. An area of the contact between the conveying roller 30 and the continuous photo film 11 is reduced by means of the central portion 33*a*, so that the possibility of degrading the continuous photo film 11 with scratches is kept the smaller.

In FIG. 1A, the continuous photo film 11 further includes a magnetic recording layer 11*c*, which is a coating of magnetic material applied to the support 11*a* on the side opposite to the photosensitive layer 11*b*, so that the photo filmstrip can operate for storing magnetic information written thereto. There is abrasive material or polishing agent, mixed with the magnetic material, for contacting a magnetic head of an information reader/writer, to remove dust or dirt from the magnetic head.

Figure 4:
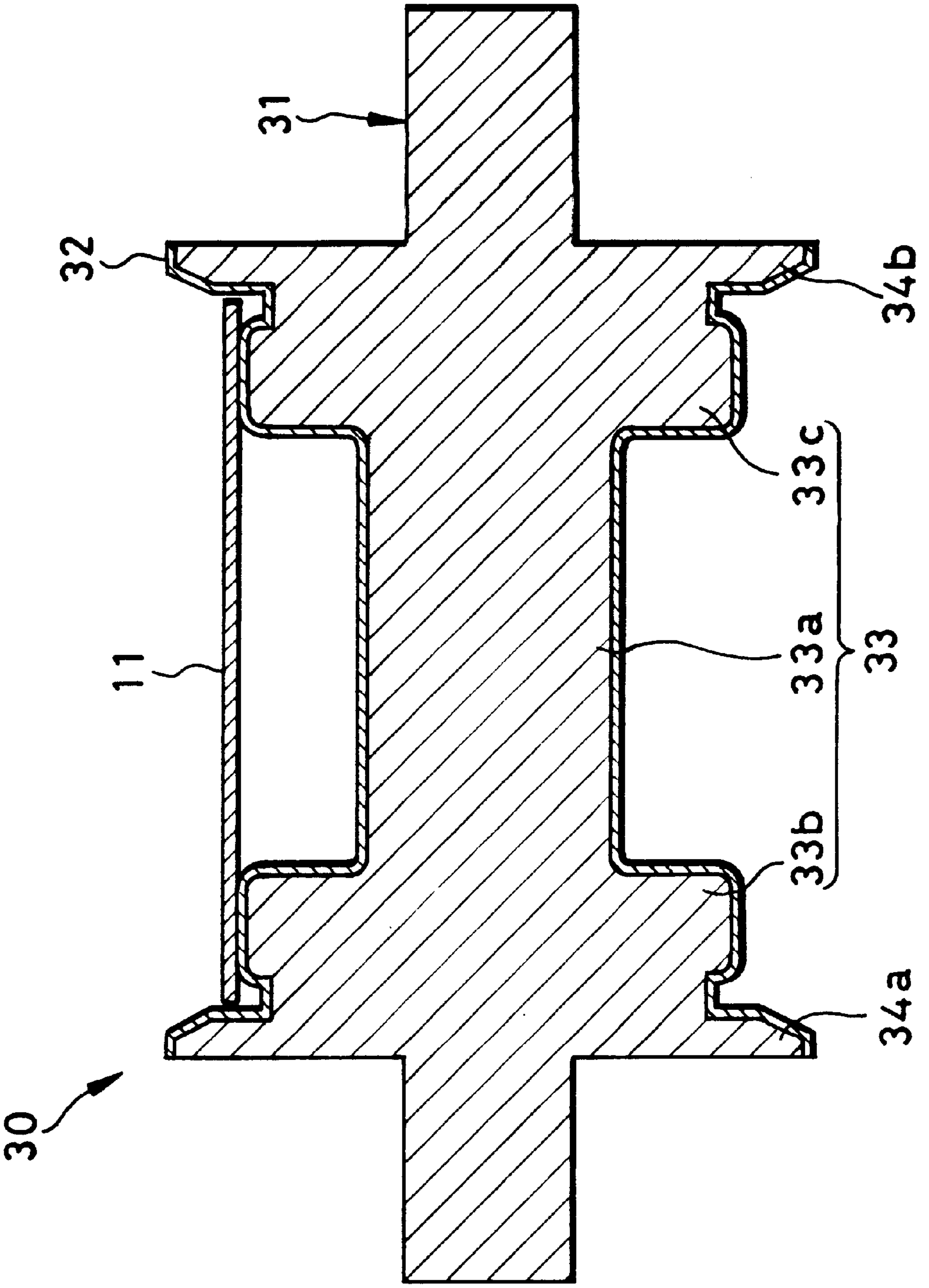
FIG. 4 is a cross section illustrating the conveying roller and the continuous photo film.

In FIG. 4, the conveying roller 30 includes a roller body 31 of metal and a hardness reinforcer layer 32 of hard material.

To produce the roller body 31, a rod of stainless steel is prepared, and cut and scraped. To form the hardness reinforcer layer 32, hard material of either ceramics or cermet is deposited to a surface of the roller body 31 by a method of thermal spraying. A region of applying the coating of the hardness reinforcer layer 32 is determined for contact with the continuous photo film 11. Examples of the hard material of the hardness reinforcer layer 32 are aluminum oxide (alumina), titanium oxide (titania), chromium oxide, mixture of aluminum oxide (alumina) and titanium oxide (titania), mixture of chromium oxide and titanium oxide (titania), tungsten carbide, and the like.

Of course the metal material for the roller body 31 is not limited to the stainless steel. The metal for producing the roller body 31 can be selected from such having sufficient hardness for being cut and scraped with a complicated partial shape. In view of ensuring sufficient physical intensity of the roller body 31, soft metal is preferably used.

It is preferred to polish and smooth the surface of the hardness reinforcer layer 32, at least peripheral surfaces of the roll portions 33*b* and 33*c* for contact with the continuous photo film 11. A smoothness between the conveying roller 30 and the continuous photo film 11 contacting each other is raised, so that abrasion of the conveying roller 30 can be avoided more reliably. It is possible to prevent pressure fogging and scratches which would damage photographing quality of the continuous photo film 11.

Experiments were conducted for the conveying roller by use of various coatings. Samples A–E of the conveying roller were produced, and subjected to a test of resistance to abrasion. For any of Samples A–E, a cylindrical rod of stainless steel was prepared, and had a diameter of 16 mm and a length of 50 mm. The rod was cut and scraped to form the roller body. A coating of hard material of plural kinds was applied to the roller body by the method of plasma thermal spraying. For evaluation of the resistance to abrasion, Samples A–E were experimentally incorporated in the photo film manufacturing apparatus, in which the continuous photo film was conveyed by each of them by a predetermined length. An amount of surface abrasion of Samples A–E was measured. Comparative Example F according to the related art was also produced, which included a roller body with a coating of a hard chromium plating. Comparative Example F was similarly evaluated.

The hard material used in the hardness reinforcer layer 32 of Samples A–E was as indicated below:

Sample A: aluminum oxide (alumina);

Sample B: aluminum oxide (alumina) and titanium oxide (titania);

Sample C: chromium oxide;

Sample D: tungsten carbide and cobalt;

Sample E: tungsten carbide and nichrome.

As a result, the conveying rollers of Samples A–E had only ⅙ as much an abraded amount of the surface as Comparative Example F in contact with the continuous photo film. It was confirmed that the conveying roller of the present invention had higher resistance to abrasion than the related art, and had six (6) or more times as long a life as the related art.

Despite those effects derived from the use of the ceramics, the ceramics characteristically have a ,comparatively great weight. If the conveying roller with the ceramic coating is used as a free roller not being directly driven by any drive unit, an effect of inertia of rotation is so great as to cause slip of the roller. The ceramic roller has a shortcoming in likeliness in damaging the photosensitive material.

Another preferred embodiment is referred to, in which a diamond-like carbon membrane or coating is used as the hardness reinforcer layer 32 on the roller surface.

To produce the roller body 31, a rod of metal is prepared, and cut and scraped. Material for producing the roller body 31 may be selected from such having sufficient hardness for being cut and scraped with a complicated partial shape. Examples of the metal for the roller body 31 include stainless steel, aluminum, or other soft metal used widely in the techniques of the rollers.

The hardness reinforcer layer 32 of a diamond-like carbon coating is formed by the ion plating method and in the region contacting the continuous photo film 11. The ion plating method is to form a coating by decomposing benzene ($C_6H_6$) in the plasma by specialized ion source. The ion plating method is characteristically useful for an article of a complicated shape, as it can form a coating in an uniform manner and with high tightness of the coating. The diamond-like carbon coating has very high hardness nearly equal to that of diamond, and has high resistance to heat, high resistance to welding, and high releasability. The diamond-like carbon coating has a very small coefficient of friction, which is 0.1–0.3 time as much as coefficients of friction of steel, super hard alloy, aluminum, glass, and ceramics. The hardness reinforcer layer 32 on the surface of the roller body 31 increases the surface hardness of the conveying roller 30, and thus increases resistance to abrasion.

The hardness reinforcer layer 32 of the diamond-like carbon coating has an amorphous structure and thus has a very smooth surface. It is likely that the diamond-like carbon coating, if a surface of the roller body 31 underlying the diamond-like carbon coating is rough, has surface roughness developed due to the surface roughness of the roller body 31 itself. Accordingly the roller body 31, before forming the diamond-like carbon coating, is polished and smoothed at least in regions of peripheral surfaces of the roll portions 33*b* and 33*c* for contact with the continuous photo film 11. The diamond-like carbon coating being subsequently formed by the ion plating method, the conveying roller 30 can have the sufficiently smoothed surface. The smoothness between the conveying roller 30 and the continuous photo film 11 is increased. Abrasion of the conveying roller 30 is thus reduced more reliably. It is possible to prevent pressure fogging and scratches which would damage the continuous photo film 11.

In the above embodiment, the conveying roller has the flanges. However a conveying roller of the present invention may lack the flanges, and may have a rod shape.

Figure 5:
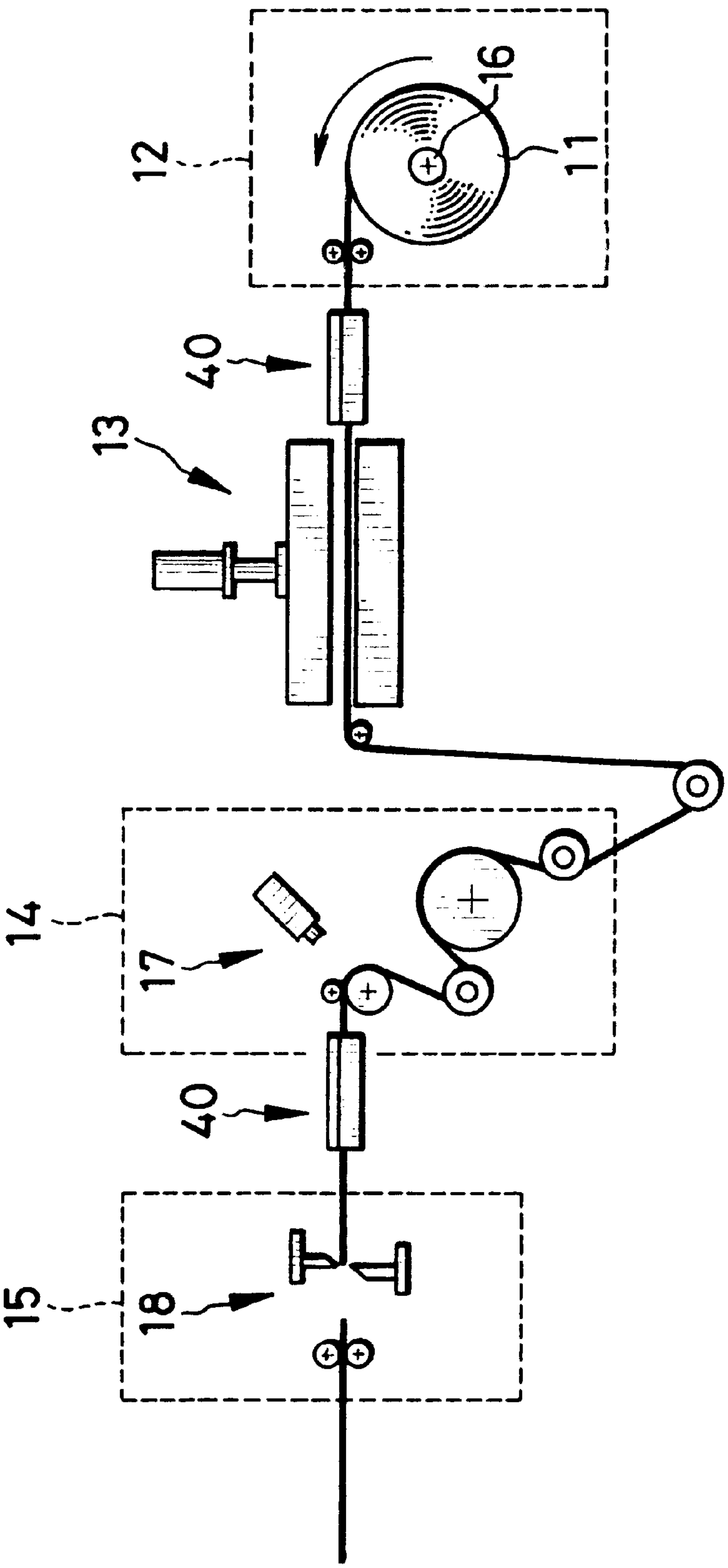
FIG. 5 is an explanatory view illustrating another preferred photo film manufacturing apparatus.
Figure 6:
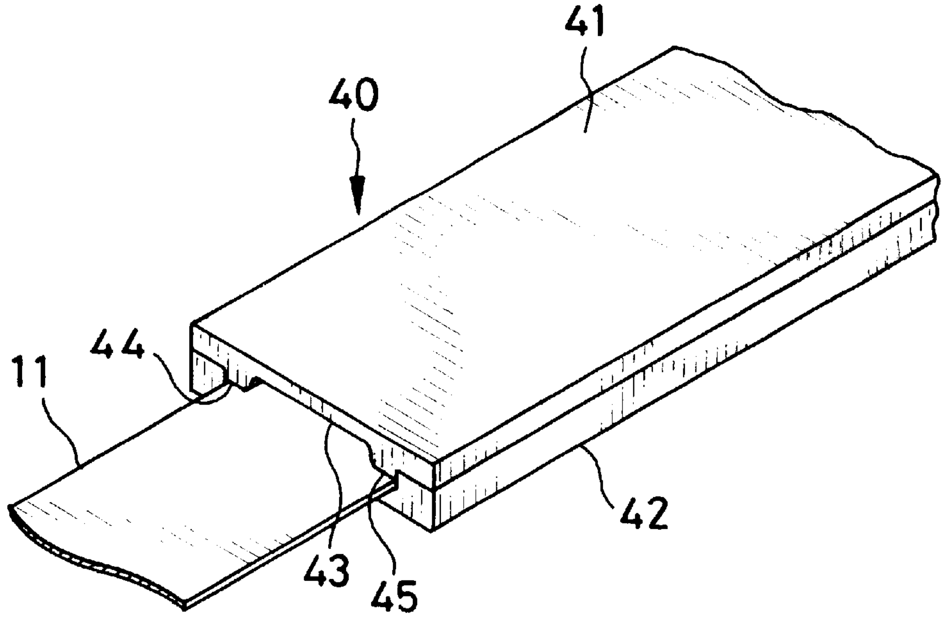
FIG. 6 is a perspective illustrating a conveyor guide rail disposed in the photo film manufacturing apparatus.
Figure 9:
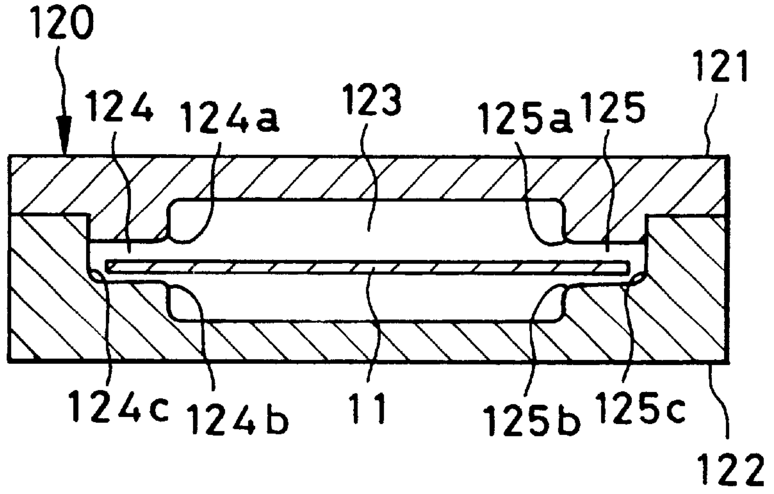
FIG. 9 (PRIOR ART)
FIG. 9 is a cross section illustrating a conveyor guide rail of the related art, with the continuous photo film.

Referring to FIGS. 5–8, a preferred embodiment of a conveyor guide rail for conveying continuous photo film is described. In order to stabilize a position where the perforator unit 13 forms a perforation and a position where the side printer unit 14 creates a latent image to the continuous photo film 11, the continuous photo film 11 must be prevented from being offset in its width direction for the purpose of stable conveyance. Accordingly, a guide rail 40 is used in the photo film manufacturing apparatus as illustrated in FIG. 5. Elements similar to those of the above embodiments are designated with similar reference numerals.

Figure 7:
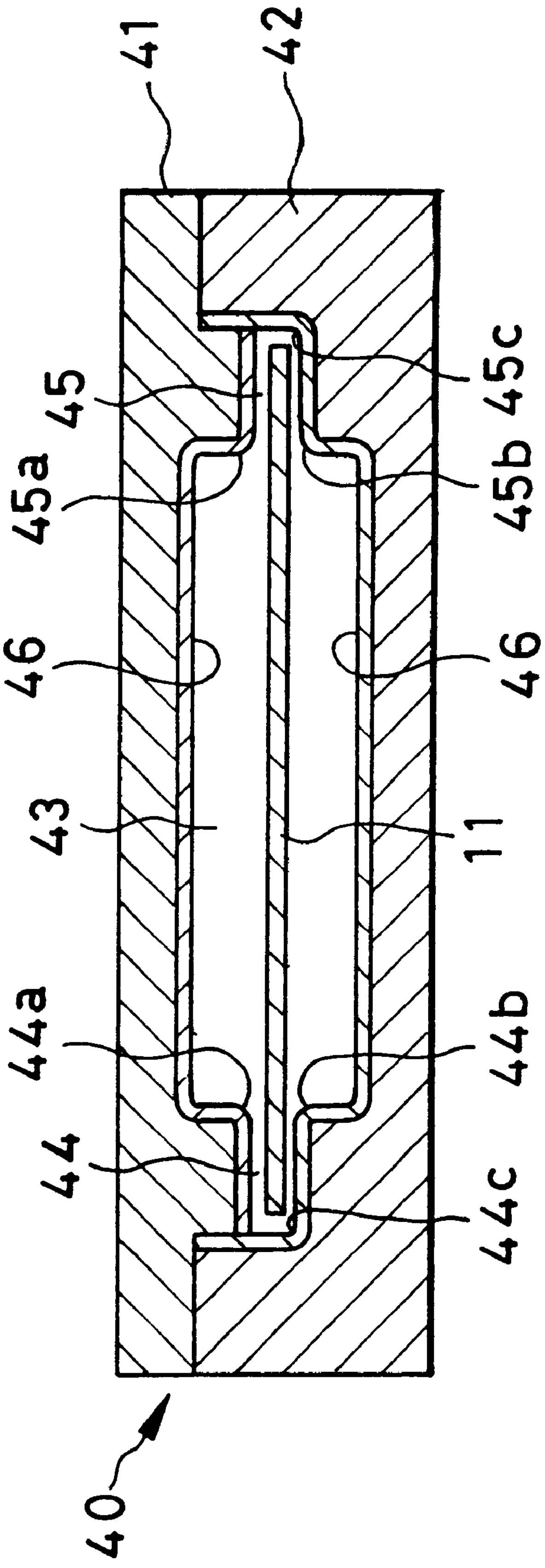
FIG. 7 is a cross section illustrating the conveyor guide rail with the continuous photo film.

In FIG. 7, the guide rail 40 of the present invention is illustrated. The guide rail 40 consists of a combination of an upper guide plate 41 and a lower guide plate 42 secured thereto. The guide plates 41 and 42 are extended in the conveying direction of the continuous photo film 11, and define a photo film conveying path 43 between them for passing the continuous photo film 11.

Respective lateral edges of the photo film conveying path 43 have support grooves 44 and 45, which are formed to reduce a range of the photo film conveying path 43 in its thickness direction. Support surfaces of the support grooves 44 and 45 support lateral edges of the continuous photo film 11. Lateral surfaces of the support grooves 44 and 45 prevent the continuous photo film 11 from being offset in the width direction. Inner corners 44*a*, 44*b*, 44*c*, 45*a*, 45*b* and 45*c* are defined on the support grooves 44 and 45, and rounded with a curvature, so as to reduce load to the continuous photo film 11 contacted by the support grooves 44 and 45. There is a hardness reinforcer layer 46 formed on inside surfaces of the photo film conveying path 43, and constituted by hard material of which the hardness is higher than that of the hardness of hard chrome plating.

Figure 8:
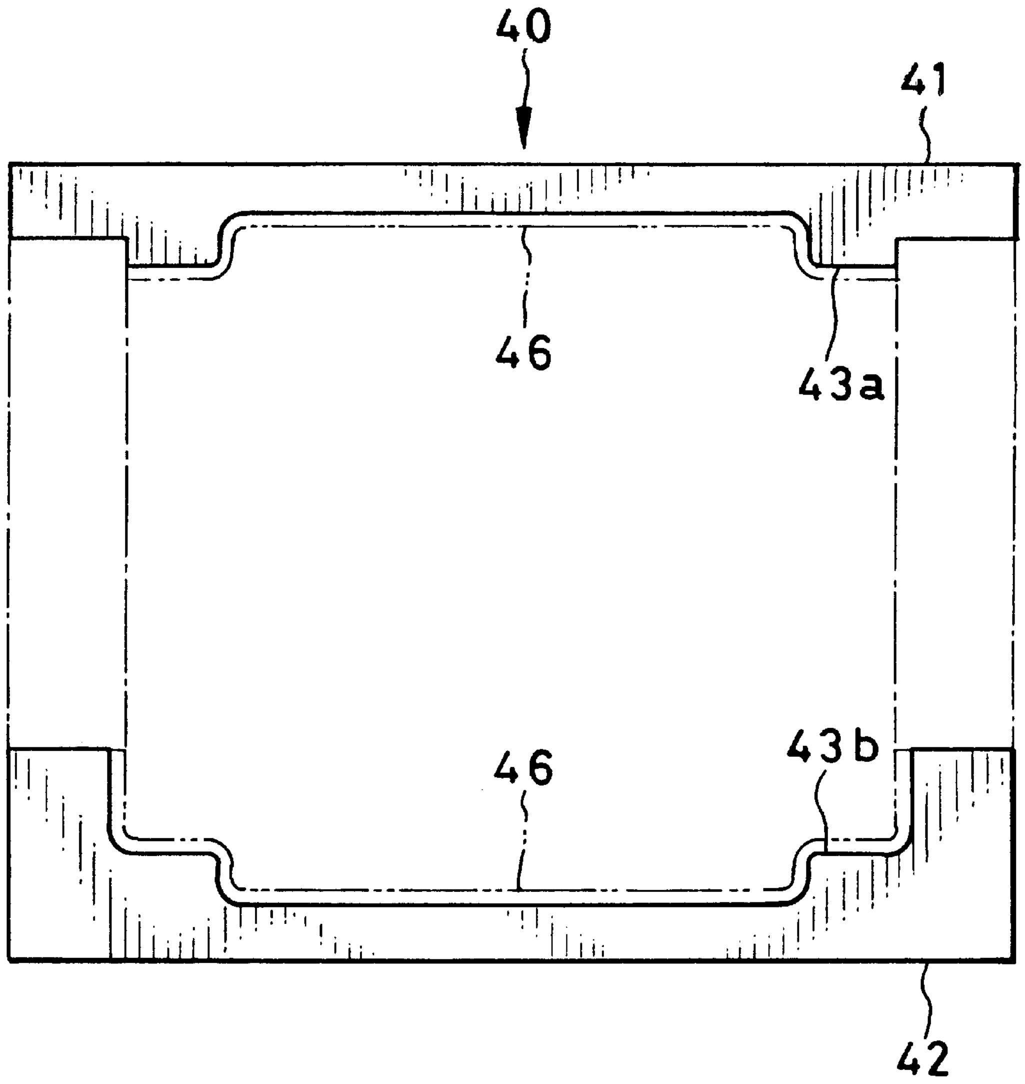
FIG. 8 is an explanatory view illustrating a structure of a conveying path of the conveyor guide rail.

In FIG. 8, the upper guide plate 41 has an upper conveying surface 43*a*. The lower guide plate 42 has a lower conveying surface 43*b*. The continuous photo film 11 is conveyed between the conveying surfaces 43*a* and 43*b*, which constitute the photo film conveying path 43. When the guide plates 41 and 42 are assembled with the conveying surfaces 43*a* and 43*b* confronted with each other, the photo film conveying path 43 is formed.

In a producing operation of the guide rail 40, a plate material is cut and scraped at first, to obtain the upper guide plate 41 having the upper conveying surface 43*a* and the lower guide plate 42 having the lower conveying surface 43*b*. Material for the guide plates 41 and 42 may be any suitable one having hardness small enough for cutting and scraping the complicated shape including the inner corners 44*a*, 44*b*, 44*c*, 45*a*, 45*b* and 45*c*. For example, stainless steel, aluminum or other soft metals may be used.

To form the hardness reinforcer layer 46, hard material of either ceramics or cermet is deposited to the upper conveying surface 43*a* of the upper guide plate 41 and the lower conveying surface 43*b* of the lower guide plate 42 by a method of thermal spraying. The thermal spraying method is characteristically useful for an article of a complicated shape including the inner corners 44*a*, 44*b*, 44*c*, 45*a*, 45*b* and 45*c*, as it can form a coating in an uniform manner and with high tightness of the coating.

The hardness reinforcer layer 46 to be applied by thermal spraying may be any suitable material having higher hardness than hard chrome plating. Examples of the thermal spraying material of the hardness reinforcer layer 46 are aluminum oxide (alumina), chromium oxide, mixture of aluminum oxide (alumina) and titanium oxide (titania), mixture of tungsten carbide and cobalt, mixture of tungsten carbide and nichrome, and the like.

Then the surface of the hardness reinforcer layer 46 on the guide plates 41 and 42 is polished or sanded and smoothed. The conveying surfaces 43*a* and 43*b* are confronted with each other. The guide plates 41 and 42 are assembled, to obtain the guide rail 40 in which the photo film conveying path 43 is coated with the hardness reinforcer layer 46.

The hardness of the material constituting the hardness reinforcer layer 46 is higher than that of the hard chrome plating. Consequently, the photo film conveying path 43 of the guide rail 40 is advantageous in that it has increased hardness in comparison with known guide rails of stainless steel or with hard chrome plating. The surface of the hardness reinforcer layer 46 is polished or sanded and smoothed, so that friction between the photo film conveying path 43 and the continuous photo film 11 is reduced. The inside surface of the support grooves 44 and 45 in contact with the continuous photo film 11 is prevented from abrasion. The longevity of the photo film conveying path 43 is thus increased. The continuous photo film 11 is prevented from being fogged with pressure or scratched, because there is no abraded dust and no deformation of the guide rail due to abrasion.

Even though the continuous photo film includes the abrasive material or polishing agent in the magnetic recording layer, the surfaces of the photo film conveying path 43 are kept free from being scratched or ground in contact with the continuous photo film.

Note that, instead of the thermal spraying, the hardness reinforcer layer 46 can be formed as a diamond-like carbon (DLC) coating according to the ion plating method. The diamond-like carbon and the ion plating method are the same as those used for forming the hardness reinforcer layer 32 on the roller body 31. The hardness reinforcer layer 46 is formed on the conveying surfaces 43*a* and 43*b* after the conveying surfaces 43*a* and 43*b* are polished or sanded and smoothed.

In the above embodiment, the whole inside surface of the photo film conveying path 43 is provided with the coating as the hardness reinforcer layer 46. However it is unnecessary to apply the coating to the central portion of the inside surface of the photo film conveying path 43. Only inside surfaces of the support grooves 44 and 45 may be coated with the hardness reinforcer layer for the purpose of increasing the resistance to abrasion in the present invention. In addition, it is unnecessary to polish and smooth the central portion of the inside surface of the photo film conveying path 43. Only inside surfaces of the support grooves 44 and 45 may be polished and smoothed.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A conveying roller and photosensitive material, wherein said photosensitive material comprises a support of resin film having a back surface, and a photosensitive layer of photographic emulsion disposed on a surface of said support opposite to said back surface; and wherein said conveying roller comprises:

a roller body of metal; and a hardness reinforcer layer, selected from the group consisting of ceramic and cermet, formed on a surface of said roller body by thermal spraying of ceramic or cermet; and wherein said photosensitive material further includes a magnetic recording layer, formed on said back surface of said support, having a magnetic material and polishing agent which contacts with said hardness reinforcer layer.

2. A conveying roller and photosensitive material as defined in claim 1, wherein said hardness reinforcer layer has a surface of which at least one portion is polished and smoothed, and said at least one portion contacts said photosensitive material.

3. A conveying roller and photosensitive material as defined in claim 2, wherein said roller body includes:

a roller core;

a pair of flanges, disposed to project from said roller core in a disk manner, for contacting respective edges of said photosensitive material, to regulate said photosensitive material therebetween in a width direction thereof; and a pair of roll portions, disposed respectively near to an inner face of said flanges, having a greater diameter than a diameter of said roller core, for supporting said photosensitive material near to said edges of said photosensitive material.

4. A conveying roller and photosensitive material as defined in claim 3, wherein said roller body further includes a pair of ring-shaped grooves each of which is formed between one of said roll portions and one of said flanges.

5. A conveying roller and photosensitive material as defined in claim 4, wherein said ceramic comprises at least one of aluminum oxide, titanium oxide, chromium oxide, mixture of aluminum oxide and titanium oxide, mixture of chromium oxide and titanium oxide, and tungsten carbide.

6. A conveying roller and photosensitive material as defined in claim 5, wherein said cermet comprises tungsten carbide with cobalt, or tungsten carbide with nichrome.

7. A conveying roller and photosensitive material as defined in claim 5, wherein said material comprises stainless steel.

* * * * *